United States Patent
Österreicher

(10) Patent No.: US 12,553,840 B2
(45) Date of Patent: Feb. 17, 2026

(54) COMPUTER-ASSISTED METHOD FOR DETERMINING AN ELEMENT FRACTION OF A DETERMINATION ELEMENT HAVING A SMALL ATOMIC NUMBER, IN PARTICULAR A LI FRACTION, AND CORRESPONDING DEVICE FOR PROCESSING DATA

(71) Applicant: GATAN INC., Pleasanton, CA (US)

(72) Inventor: Johannes Österreicher, Mattighofen (AT)

(73) Assignee: GATAN INC., Pleasanton, CA (US)

( * ) Notice: Subject to any disclaimer, the term of this patent is extended or adjusted under 35 U.S.C. 154(b) by 399 days.

(21) Appl. No.: 18/021,279

(22) PCT Filed: Aug. 26, 2021

(86) PCT No.: PCT/AT2021/060297
§ 371 (c)(1),
(2) Date: Feb. 14, 2023

(87) PCT Pub. No.: WO2022/056562
PCT Pub. Date: Mar. 24, 2022

(65) Prior Publication Data
US 2023/0296540 A1 Sep. 21, 2023

(30) Foreign Application Priority Data
Sep. 16, 2020 (AT) .............. A 50783/2020

(51) Int. Cl.
*G01N 23/2206* (2018.01)
*G01N 23/203* (2006.01)
*G01N 23/2252* (2018.01)

(52) U.S. Cl.
CPC ....... *G01N 23/2206* (2013.01); *G01N 23/203* (2013.01); *G01N 23/2252* (2013.01);
(Continued)

(58) Field of Classification Search
CPC ...... H01J 2237/2807; H01J 2237/2805; G01N 23/2206; G01N 23/203; G01N 23/2252;
(Continued)

(56) References Cited

U.S. PATENT DOCUMENTS

| | | | |
|---|---|---|---|
| 4,476,386 A | * | 10/1984 | Reid ............... H01J 37/28 250/307 |
| 5,142,149 A | | 8/1992 | Isakozawa et al. |

(Continued)

FOREIGN PATENT DOCUMENTS

| | | |
|---|---|---|
| CA | 2876013 | 8/2020 |
| CN | 115598018 | 1/2023 |

(Continued)

OTHER PUBLICATIONS

Österreicher, Johannes A., et al. "Spatial lithium quantification by backscattered electron microscopy coupled with energy-dispersive X-ray spectroscopy." Scripta Materialia 194 (Mar. 2021): 113664 (Year: 2021).*

(Continued)

*Primary Examiner* — Wyatt A Stoffa
(74) *Attorney, Agent, or Firm* — GREENBLUM & BERNSTEIN, P.L.C.

(57) ABSTRACT

A computer-assisted method for determining an element fraction of a determination element, in particular with a small atomic number, especially lithium, of an examination region of a sample bombarded with primary electrons, wherein a backscattered electron signal, preferably a backscattered electron image, captured using a backscattered electron detector and a spectroscopy element composition of the examination region determined using an X-ray spectroscopy detector, such as an EDX detector, are obtained. A practicable quantitative determination can be achieved if a measured gray value SM determined from the backscattered (Continued)

electron signal is combined with element fractions of the spectroscopy element composition in order to determine a fraction of the determination element. A device for processing data and to a computer product for carrying out the method is also disclosed.

13 Claims, 3 Drawing Sheets

(52) U.S. Cl.
CPC . *G01N 2223/053* (2013.01); *G01N 2223/079* (2013.01); *G01N 2223/402* (2013.01); *G01N 2223/418* (2013.01)

(58) Field of Classification Search
CPC ....... G01N 2223/053; G01N 2223/079; G01N 2223/402; G01N 2223/418
See application file for complete search history.

(56) References Cited

U.S. PATENT DOCUMENTS

| | | | |
|---|---|---|---|
| 8,222,598 B2 | 7/2012 | Barkshire et al. | |
| 8,664,595 B2* | 3/2014 | Buhot | G01N 23/2252 250/306 |
| 9,719,950 B2* | 8/2017 | Owen | H01J 37/252 |
| 9,734,986 B2* | 8/2017 | Owen | H01J 37/252 |
| 9,752,997 B2* | 9/2017 | Anan | G01N 23/2252 |
| 9,899,185 B1* | 2/2018 | Shemesh | H01J 37/244 |
| 11,022,565 B2* | 6/2021 | Shemesh | G01N 23/2206 |
| 12,458,642 B2* | 11/2025 | Sparks | C07D 403/14 |
| 2006/0028643 A1* | 2/2006 | Gottlieb | G01N 23/2206 356/300 |
| 2006/0291619 A1* | 12/2006 | Statham | G01N 23/22 378/45 |
| 2013/0054153 A1* | 2/2013 | Motl | H01J 37/244 702/28 |
| 2014/0001356 A1 | 1/2014 | Buhot et al. | |
| 2016/0245762 A1 | 8/2016 | Owen et al. | |
| 2018/0328905 A1* | 11/2018 | Jacobi | G01N 23/2251 |
| 2024/0355943 A1* | 10/2024 | Mooney | H10F 39/024 |

FOREIGN PATENT DOCUMENTS

| | | |
|---|---|---|
| JP | 03-51749 | 3/1991 |
| JP | 2013-19900 | 1/2013 |
| JP | 2016-114547 | 6/2016 |
| JP | 2017-83235 | 5/2017 |
| JP | 2020-030208 | 2/2020 |
| JP | 2021-190184 | 12/2021 |

OTHER PUBLICATIONS

Int'l Search Report (Form PCT/ISA/210) conducted in Int'l Appln. No. PCT/AT2021/060297 (Nov. 10, 2021).
Int'l Written Opinion (Form PCT/ISA/237) conducted in Int'l Appln. No. PCT/AT2021/060297 (Nov. 10, 2021).
Int'l Prelim. Exam. Report (Form PCT/IPEA/409) conducted in Int'l Appln. No. PCT/AT2021/060297 (Mar. 24, 2022).
Austria Search Report conducted in counterpart Austria Appln. No. A 50783/2020 (Jul. 22, 2021).
P. Hovington et al., "Can We Detect Li K X-ray in Lithium Compounds Using Energy Dispersive Spectroscopy?", Scanning, vol. 38, pp. 571-578, (Feb. 3, 2016) URL: <https://onlinelibrary.wiley.com/doi/epdf/10.1002/sca.21302>.
L. Xiaobing et al., "Detection of Lithium X-rays by EDS", Microscopy and Microanalysis , vol. 19, Issue S2: Proceedings of Microscopy & Microanalysis 2013, pp. 1136-1137, (Oct. 9, 2013) URL: <https://doi.org/10.1017/S1431927613007678>.
S. Burgess et al., "High spatial resolution energy dispersive X-ray spectrometry in the SEM and the detection of light elements including lithium", Microscopy and Analysis, 27(4) (May 2013), URL:<https://analyticalscience.wiley.com/do/10.1002/micro.620/full/>.
S. Bessette et al., "Nanoscale Lithium Quantification in LiXNiyCowMnZO2 as Cathode for Rechargeable Batteries", Scientific Reports 8, Article No. 17575 (Dec. 4, 2018), URL: <https://dx.doi.org/10.1038/s41598-018-33608-3>.
Official Action in Japanese patent application No. 2023-508494 dated Jun. 3, 2025, along with English-language translation thereof.

* cited by examiner

COMPUTER-ASSISTED METHOD FOR DETERMINING AN ELEMENT FRACTION OF A DETERMINATION ELEMENT HAVING A SMALL ATOMIC NUMBER, IN PARTICULAR A LI FRACTION, AND CORRESPONDING DEVICE FOR PROCESSING DATA

The invention relates to a computer-assisted method for determining an element fraction of a determination element, in particular with a small atomic number, especially lithium, of an examination region of a sample bombarded with primary electrons, wherein a backscattered electron signal, preferably a backscattered electron image, captured using a backscattered electron detector, and a spectroscopy element composition of the examination region determined using an X-ray spectroscopy detector, such as an EDX detector, are obtained.

The invention furthermore relates to a device for processing data.

Additionally, the invention relates to a computer program product.

From the prior art, it is known that both a topography and also an element composition of an examination region of a sample can be determined by means of electron microscopy. For this purpose, primary electrons are typically shot at the examination region using an electron gun, and then inelastically scattered electrons are detected using a secondary electron detector, elastically scattered electrons are detected using a BSE detector (backscattered electron detector), and/or emitted X-ray radiation is detected using an X-ray spectroscopy detector, typically an EDX detector (energy-dispersive X-ray spectroscopy detector) or a WDX detector (wavelength dispersive X-ray spectroscopy detector). With position-dependent rendering, a gray value image of a sample surface of the examination region that is suitable for representing a topography of the sample surface can be generated based on the detected secondary electrons, a gray value image of the sample surface that is suitable for depicting a spatial distribution of elements of the sample surface can be generated based on the detected backscattered electrons (BSE), and an element composition of the sample surface can be determined based on the detected X-ray radiation.

A depiction of the spatial element distribution by means of the backscattered electron detector is normally based on the dependence of a yield of backscattered electrons on a mean atomic number of the examination region. The higher the mean atomic number, the higher a yield of backscattered electrons and the lighter will be a corresponding gray value in the gray value image.

A determination of the element composition by means of EDX is normally based on the energy-dependent depiction of detected X-ray radiation and element-specific assignment of characteristic X-ray radiation peaks. Here, there normally results the difficulty that elements with a lower atomic number, usually elements with an atomic number less than five, that is elements with an atomic number smaller than that of boron, can no longer be detected. A quantitative analysis is often only feasible for higher atomic numbers, in many cases starting at the atomic number 7. This can be explained by the fact that characteristic X-ray radiation of such elements with a small atomic number is very low-energy, and is often absorbed both in the sample itself and also in windows of X-ray radiation detectors. In particular through a use of windowless X-ray radiation detectors, a detection limit can be extended to lower atomic numbers, wherein achievable detection limits are normally higher than 20 wt % to 30 wt %. A detection and, in particular, a quantitative determination of elements with low atomic numbers proves to be inherently problematic, however. This applies in particular to elements such a lithium or beryllium.

This is addressed by the invention. The object of the invention is to specify a method of the type named at the outset with which a quantitative determination of a determination element, in particular a determination element with a small atomic number, is enabled in a practicable manner.

Furthermore, an object is to specify a device of the type named at the outset with which a quantitative determination of a determination element, in particular a determination element with a small atomic number, is enabled in a practicable manner.

Additionally, an object is to specify a computer program product of the type named at the outset with which a quantitative determination of a determination element, in particular a determination element with a small atomic number, is enabled in a practicable manner.

According to the invention, the object is attained with a method of the type named at the outset if a measured gray value determined from the backscattered electron signal, in particular backscattered electron image, is combined with element fractions of the spectroscopy element composition in order to determine a fraction of the determination element.

The invention is based on the idea of using a dependence of a yield, or of backscatter coefficients of backscattered electrons, on the atomic number in order to compensate a lacking detection sensitivity of X-ray spectroscopy. The gray value of a backscattered electron image, or of one or more of the pixels thereof, also referred to as the measured gray value, is a function of the mean atomic number of the examination region of the sample. Elements with a low atomic number, such as lithium or beryllium for example, decrease the gray value in the backscattered electron image in comparison with a gray value image in which said elements are not included. Because the spectroscopy element composition of the examination region, that is the element composition of the examination region determined by means of X-ray spectroscopy, is combined with the gray value, the determination of elements, or the fractions thereof, which are not represented, or only marginally represented, by the spectroscopy element composition is made possible. In particular, determination elements with a small atomic number, in particular determination elements having an atomic number smaller than five, preferably lithium or beryllium for example, can thus be quantitatively or proportionally determined. This enables a simple and practicable determination of one or more determination element fractions that otherwise cannot be determined at all or only in a costly manner.

It shall be understood that, customarily in the art and accordingly in this document, gray value and measured gray value are used as a synonym for a brightness value or intensity value that denotes a brightness or intensity of a measurement signal or of the backscattered electron signal, normally of one or more pixels of an image. The term gray value shall in particular be viewed independently of a specific coloring and can, in principle, be combined with any desired colors. A gray value can thereby be a mean or averaged gray value of multiple other gray values. It is normally provided that a backscattered electron image is generated with the backscattered electron signal captured by the backscattered electron detector, for which reason an intensity of the backscattered electron signal is typically referred to as a gray value or measured gray value. However, the generation of a backscattered electron image with or from the backscattered electron signal is not absolutely necessary. For example, the backscattered electron signal, or the measured gray value thereof, can be used alternatively or cumulatively to the measurement of individual points or lines of the examination region.

It is practicable if a combination between the measured gray value and the element fractions of the spectroscopy element composition occurs using backscatter coefficients of the element fractions. Customarily in the art, backscatter coefficient typically refers to a ratio of backscattered electrons emitted between a surface region or examination region and primary electrons striking the surface. Backscatter coefficients can be taken from the literature and/or simulated and/or determined using calibration measurements. A gray value S of a backscattered electron signal or backscattered electron image correlates with the backscatter coefficient $\eta$, in particular a mean or averaged backscatter coefficient $\bar{\eta}$. The backscatter coefficient is thereby a function of the atomic number Z. For mixtures of elements, the mean backscatter coefficient $\bar{\eta}$ can, for example, be stated accordingly as:

$$\bar{\eta} = \sum_{i=1}^{n} c_i \bar{\eta}_i$$

wherein $c_i$ denotes a weight percent and $\bar{\eta}_i$ denotes a backscatter coefficient for an element i. Based on known element-specific backscatter coefficients, an assignment to gray values of a backscattered electron signal or backscattered electron image is thus feasible, and gray value contributions by elements to a gray value of this type can be cumulated. Thus, a respective backscatter coefficient of an element of the spectroscopy element composition can expediently be used in order to implement a combination between the measured gray value and the spectroscopy element composition or the element fractions of the elements thereof.

It is practical if a reference gray value is calculated using the element fractions of the spectroscopy element composition and a fraction of the determination element is determined using a comparison or a combination, in particular a difference, of the measured gray value and reference gray value. Because a measured gray value is calculated from the backscattered electron signal on the one hand and on the other hand a reference gray value is calculated using element fractions determined by means of X-ray spectroscopy, a fraction of the determination element can be easily determined from a comparison thereof, which fraction is not present, or only present to a marginally pronounced extent, in the spectroscopy element composition or element fractions thereof, or is not represented thereby.

For a high practicability, it has proven effective if the comparison of the measured gray value and reference gray value is implemented using a difference thereof. Cumulatively or alternatively, however, these can also be placed in relation using a formation of a proportion or ratio, or using another mathematical comparison method or combination method customary in the art.

It is expedient if the reference gray value is determined using respective backscatter coefficients of the element fractions of the spectroscopy element composition. This enables a particularly practicable calculation of the comparison gray value.

Typically, the measured gray value is a mean or averaged measured gray value, and the reference gray value is possibly a mean or averaged reference gray value. An averaging thereby normally takes place via the examination region and/or the detected elements.

For a high accuracy, it is beneficial if one or more calibration samples have been or are measured using the backscattered electron detector, in order to assign specific gray values, in particular gray value contributions, to specific elements or element fractions or element compositions. A relation, and therefore the combination, between the measured gray value and spectroscopy element composition can thus be stated more precisely. In particular, the reference gray value and/or backscatter coefficients can thus be determined in a practicable manner. Advantageously, measuring system-dependent influences can be taken into account in this manner. It shall be understood that the gray values assigned to the elements or element compositions are normally mean or averaged gray values. Samples with a known composition, in particular single-element calibration samples, normally with the highest possible purity, are typically used as calibration samples, also referred to as calibration standards. A correlative relation between specific elements or element compositions and the reference gray value or a contribution thereto can thus be easily produced.

Analogously, it is correspondingly advantageous if at least one calibration sample formed with or from the determination element has been or is measured using the backscattered electron detector in order to assign a gray value, in particular gray value contribution, to the determination element or a determination element fraction. The fraction of the determination element can thus be determined in a particularly precise manner. This enables a refined combination between the measured gray value and spectroscopy element composition. In particular, a related backscatter coefficient can thus, in particular while taking into account measuring system-dependent influences, be practicably determined. It shall be understood that this is normally a mean gray value or gray value contribution. Alternatively or cumulatively, it can be beneficial if an assignment of a gray value or gray value contribution to a determination element fraction is carried out by means of simulation, in particular Monte Carlo simulation.

In a measurement of aforementioned calibration samples, a gray value S is normally determined as a function of an atomic number Z, that is, S over Z, or a corresponding calibration curve is formed. Here, non-linear relations can emerge, which make a calibration difficult. It is beneficial if, in a calibration of this type or in a measurement of calibration samples, a ratio of gray value S and backscatter coefficient $\eta$ is determined as a function of the atomic number Z, that is $$\left(\frac{S}{\eta}\right)$$

over Z. The calibration can thus be simplified, and a high precision during an evaluation of the determination element can advantageously be ensured.

It has proven effective if the backscattered electron detector is operated during a measurement of one of the aforementioned calibration samples such that contrast and/or brightness of the determined gray value lie in a range of 20% to 80%, in particular 30% to 70%, preferably 40% to 60%, of a maximum contrast value or brightness value of a related gray value spectrum. This can usually be set using the operating parameters of the backscattered electron detector.

Typically, it is provided that the examination region of the sample is bombarded with a primary electron beam and electrons backscattered from the examination region are detected using a backscattered electron detector, in order to capture the backscattered electron signal or backscattered electron image, and X-rays emitted from the examination region are detected using an X-ray spectroscopy detector, such as an EDX detector and/or a WDX detector, in order to determine the spectroscopy element composition. This enables a practicable measurement, in particular with a standard method such as, for example, electron microscopy, in particular scanning electron microscopy or transmission electron microscopy. A detection using the backscattered electron detector and a detection using the X-ray spectroscopy detector can take place in a chronologically parallel or consecutive manner.

It is beneficial if a detection using the backscattered electron detector and a detection using the X-ray spectroscopy detector are carried out in an essentially chronologically parallel manner. This enables a low-error measurement and, to corresponding advantage, a precise determination of the determination element fraction.

In principal, a detection using the backscattered electron detector and a detection using the X-ray spectroscopy detector can be carried out with identical or different primary electron beam voltages for accelerating the primary electrons. Backscattered electrons and X-rays normally exhibit different interaction volumes, that is, different sample volume regions from which the backscattered electrons and X-rays are emitted. The interaction volume of the X-ray radiation is thereby normally greater than that of the backscattered electrons. To equalize these, it is expedient if a detection using the backscattered electron detector and a detection using the X-ray spectroscopy detector are carried out at different primary electron beam voltages for accelerating the primary electrons. Normally, the detection using the backscattered electron detector is carried out at a higher primary electron beam voltage than the detection with the X-ray spectroscopy detector. It has proven effective if the respective primary electron beam voltage is chosen such that an interaction volume depth of the interaction volume in a detection using the backscattered electron detector and an interaction volume depth of the interaction volume in a detection using the X-ray spectroscopy detector are essentially the same size for at least a 70th percentile, in particular at least an 80th percentile, preferably at least a 90th percentile, particularly preferably at least a 95th percentile, of the respective interaction volume depth. Normally, the measurements then cannot be conducted in a chronologically parallel manner, but a coordination of the interaction volumes advantageously enables a particularly high accuracy when determining the fraction of the determination element. It can be beneficial if the respective primary electron beam voltages are determined by means of simulation, in particular a Monte Carlo simulation. In this manner, the interaction volumes can be coordinated with one another particularly well. In the specific case where a material structure that is to be examined is larger than an interaction volume in a detection using the X-ray spectroscopy detector, roughly equal primary electron beam voltages can normally be used.

It is advantageous if the method is embodied in order to determine a fraction of lithium or beryllium, or if said elements are envisaged as a determination element. Through a combination or a comparison of the measured gray value and spectroscopy element composition, or in particular the reference gray value, these elements or the fractions thereof can be determined in a practicable and low-cost manner, in particular within the scope of an electron-microscopic examination. This applies in particular to lithium, which can only be determined quantitatively in particular with great cost using methods customary in the art.

It has proven effective if the fraction x of the determination element is calculated in that a difference between the measured gray value $S_M$ and reference gray value $S_V$ is placed in a ratio with the reference gray value, that is:

$$x = \frac{S_M - S_V}{S_V}.$$

A particularly high precision can be achieved if, in addition, an element-specific determination element gray value $S_B$ is also taken into consideration in that the difference between the measured gray value $S_M$ and the reference gray value $S_V$ is placed in a ratio with a difference between the determination element gray value and the reference gray value, that is:

$$x = \frac{S_M - S_V}{S_B - S_V}.$$

The determination element gray value can be determined by means of aforementioned calibration and/or a simulation, in particular a Monte Carlo simulation. In many cases, however, it is sufficient if said value is presumed to be approximately zero. Typically, the measured gray value and reference gray value and determination element gray value are thereby stated as averaged values.

It is beneficial if a distribution of the determination element is stated or depicted along a surface of the sample or examination region. In particular, it is thus possible to adapt, in particular iteratively, the examination region or the extension thereof, in order to increase a precision of the measurement or determination element determination. This can preferably take place within the scope of an element mapping.

According to the invention, the object is attained with a device for processing data of the type named at the outset if the device comprises means, such as at least one processor, which are adapted to carry out the method according to one of the aforementioned methods, in particular to perform, in the specified manner, a combination between a measured gray value determined from the backscattered electrons and a spectroscopy element composition, in order to determine a fraction of the determination element, or in particular to calculate on the one hand a measured gray value from the backscattered electron signal, in particular backscattered electron image, and to calculate on the other hand a reference gray value using element fractions of the spectroscopy element composition, and to then determine a fraction of the determination element using a comparison of the measured gray value and reference gray value. Analogously to the aforementioned advantages and effects, a practicable determination of a fraction of the determination element can be carried out in this manner. Typically, the device comprises one or more processors, or is embodied with or as a computer.

It shall be understood that the device according to the invention can be embodied in correspondence with or analogously to the features, advantages, and effects which are described within the scope of a, in particular aforementioned, method for determining an element fraction. The same also applies to the device according to the invention in regard to the method.

It has proven effective if the device is embodied as part of an electron microscope, or is coupled to an electron microscope for data transmission. The enables a particularly practicable determination of the determination element or the fraction thereof. The electron microscope can thereby be embodied, for example, as a scanning electron microscope or transmission electron microscope. It shall be understood that the method for determining an element fraction thereby typically has been or is implemented in the scope of an electron-microscopic measurement. The electron microscope advantageously comprises a backscattered electron detector for capturing a backscattered electron signal, in particular backscattered electron image, and an X-ray spectroscopy detector for determining a spectroscopy element composition of an examination region of a sample.

In the case of a transmission electron microscope (TEM), due to the structural principle thereof, an atomic number-dependent electron scattering normally takes place essentially in the direction of a shooting direction of the primary electrons, or in a direction of the primary electrons that runs through the sample. Accordingly, in the specific case of a transmission electron microscope, electrons that penetrate the sample, which electrons are suitable for effecting an atomic number contrast, correspond to backscattered electrons for the purposes of this document, and should specifically be considered to be comprised by or included in the term backscattered electrons. Accordingly, in this case, an electron detector that detects electrons of this type that are suitable for generating an atomic number contrast, should, for the purposes of this document, specifically be considered to be comprised by or included in the term backscattered electron detector. In the case of a transmission electron microscope, a high-angular darkfield detector (HAADF detector) in particular has proven beneficial as a backscattered electron detector, wherein electrons are detected, normally concentrically around an optical axis of the transmission electron microscope, on a side of the sample facing away from a primary electron source of the transmission electron microscope. An atomic number contrast thereby normally scales with a square of the atomic number.

According to the invention, the other object is attained with a computer program product of the type named at the outset if the computer program product comprises commands which, when the computer program product is run by a computer or aforementioned device for processing data, causes said computer or device to carry out the method for determining an element fraction, in particular to perform, in the specified manner, a combination between a measured gray value determined from the backscattered electrons and a spectroscopy element composition, in order to determine a fraction of the determination element, or in particular to calculate on the one hand a measured gray value from the backscattered electron signal, in particular backscattered electron image, and to calculate on the other hand a reference gray value using element fractions of the spectroscopy element composition, and to then determine a fraction of the determination element using a comparison of the measured gray value and reference gray value. Analogously to the aforementioned advantages and effects, a practicable determination of a fraction of the determination element can be carried out in this manner. It is expedient if the computer program product is embodied as part of the device for processing data or is installed as intended on said device.

It shall be understood that the computer program product according to the invention can be embodied in correspondence with or analogously to the features, advantages, and effects which are described within the scope of a, in particular aforementioned, method for determining an element fraction.

Advantageously, a computer-readable storage medium is provided on which the computer program product is stored. The enables a practicable running of the computer program product or carrying out of the method for determining an element fraction. The storage medium can be embodied as a volatile or non-volatile storage medium. The storage medium can expediently be embodied as part of an aforementioned device for processing data.

Additional features, advantages, and effects follow from the exemplary embodiments described below. In the drawings which are thereby referenced:

A gray value of a backscattered electron image, referred to as the measured gray value $S_M$, of a surface of a sample is a function of a mean atomic element of the surface of the sample. Elements having a low atomic number, such as lithium for example, decrease the gray value. By calculating a reference gray value $S_V$ based on an element composition of the surface determined by means of X-ray spectroscopy, in which composition lithium is not represented due to inadequate sensitivity of X-ray spectroscopy to lithium, the Li content of the surface of the sample can be determined by combining the measured gray value $S_M$ of the backscattered electron image with the reference gray value $S_V$. Typically, the measured gray value $S_M$ and reference gray value $S_V$ are thereby respectively stated as an averaged value. The backscattered electron image, customarily referred to in the art as a BSE image, is typically captured using a backscattered electron detector, or BSE detector. The element composition of the surface is normally determined by means of energy-dispersive X-ray spectroscopy, referred to as EDX.

Figure 1:
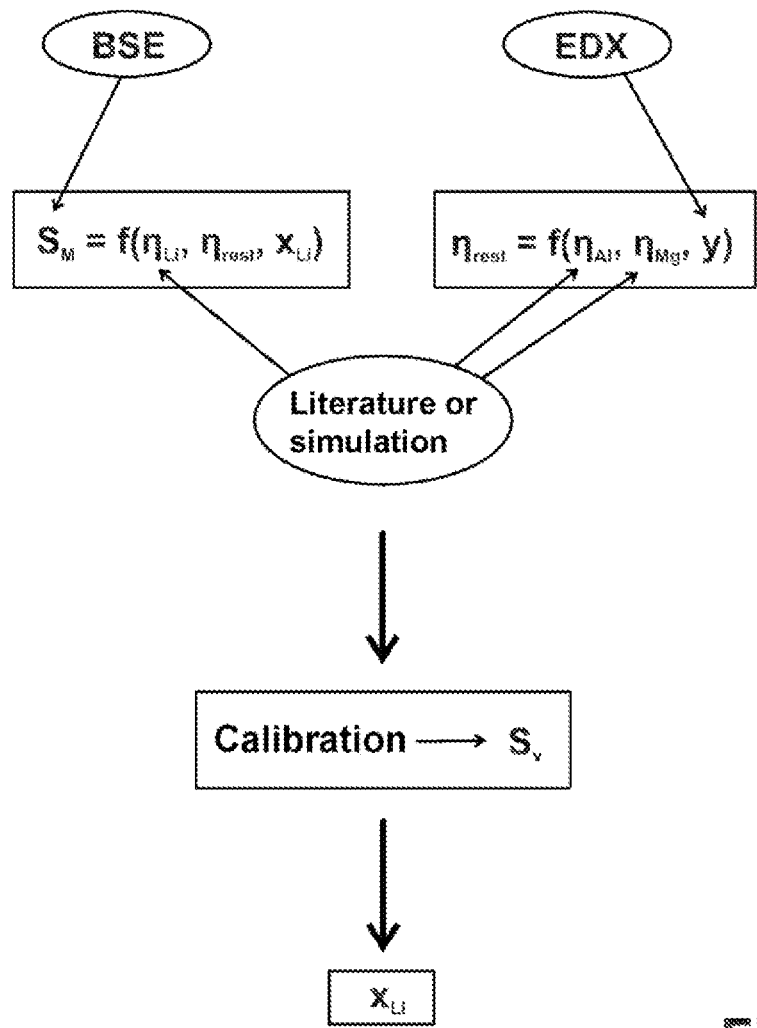
FIG. 1 shows a schematic illustration of a conceptional sequence of method for determining a fraction of lithium as a determination element.

FIG. 1 shows a conceptual basic concept by way of example of a ternary Mg—Li—Al alloy. A gray value $S_M$, where $S_M=f(\eta_{Li}, \eta_{rest}, x_{Li})$, can be assigned to a backscattered electron image (BSE image) of an examination region of a sample, with a backscatter coefficient $\eta_{Li}$ for Li and a backscatter coefficient $\eta_{rest}$ for a mixture of Mg and Al at a ratio y. In this case, $x_{Li}$ signifies the ratio of Li to said mixture of Mg and Al. Furthermore, it also holds that $\eta_{rest}=f(\eta_{Al}, \eta_{Mg}, y)$ with the backscatter coefficients $\eta_{Al}$ and $\eta_{Mg}$ for Al and Mg. The backscatter coefficients $\eta_{Al}$, $\eta_{Mg}$, and $\eta_{Li}$ can be determined from the literature or by means of simulation. y can be determined by means of X-ray spectroscopy, and $S_M$ can be determined from the backscattered electron image. By determining a reference gray value $S_V$ from fractions of Al and Mg determined by means of EDX, a functional relation can be mathematically solved. This can preferably take place using backscattered electron images of calibration standards in order to precisely determine the reference gray value $S_V$.

As a result, $x_{Li}$ can be calculated, and a fraction of Li in the examined sample surface can thus be determined.

A determination of a fraction of lithium as a determination element is described below by way of example with the aid of two Mg—Li-based alloys LAX410 and LSX2021. For this purpose, one backscattered electron image each of an examination region, customarily referred to in the art as ROI or region of interest, of alloy samples of the respective alloy is determined, and one spectroscopy element composition of the respective examination region is determined by means of energy-dispersive X-ray spectroscopy, or EDX. The nominal compositions of LAX410 and LSX2021 are shown in wt % in Table 1. The alloy samples were produced using an electric induction furnace under argon protective gas atmosphere. To distinguish the alloy samples, a field-emission scanning electron microscope was used, wherein a silicon drift detector was used for EDX and a four-quadrant semiconductor detector was used to capture the backscattered electron image.

TABLE 1

Nominal composition of LAX410 and LSX2021 in wt %.

|  | Mg | Li | Al | Si | Ca |
|---|---|---|---|---|---|
| LAX410 | Remainder | 4.0 | 0.8 | — | 0.3 |
| LSX2021 | Remainder | 20.0 | — | 2.0 | 1.0 |

Figure 2:
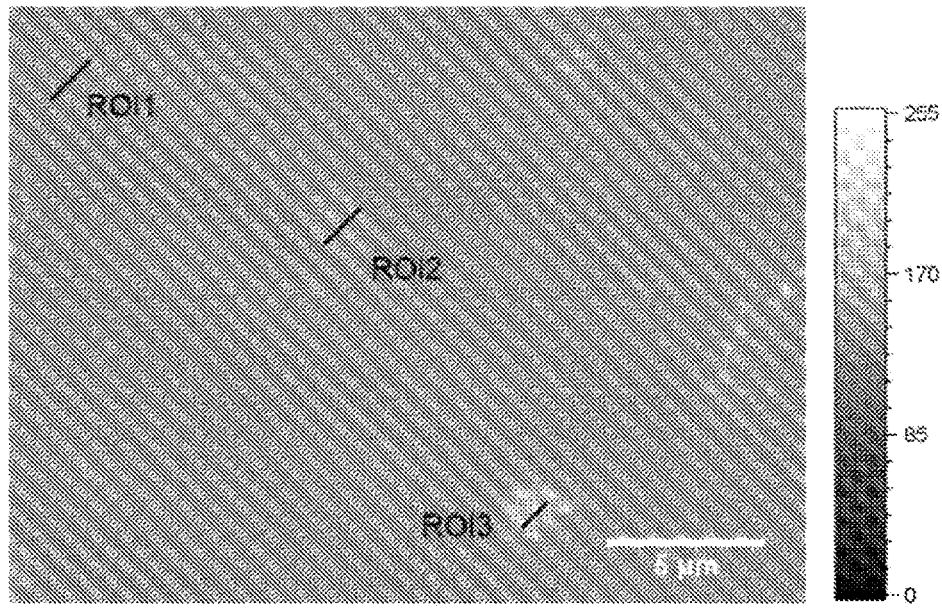
FIG. 2 shows an illustration of a backscattered electron image of an LX410 alloy sample.
Figure 3:
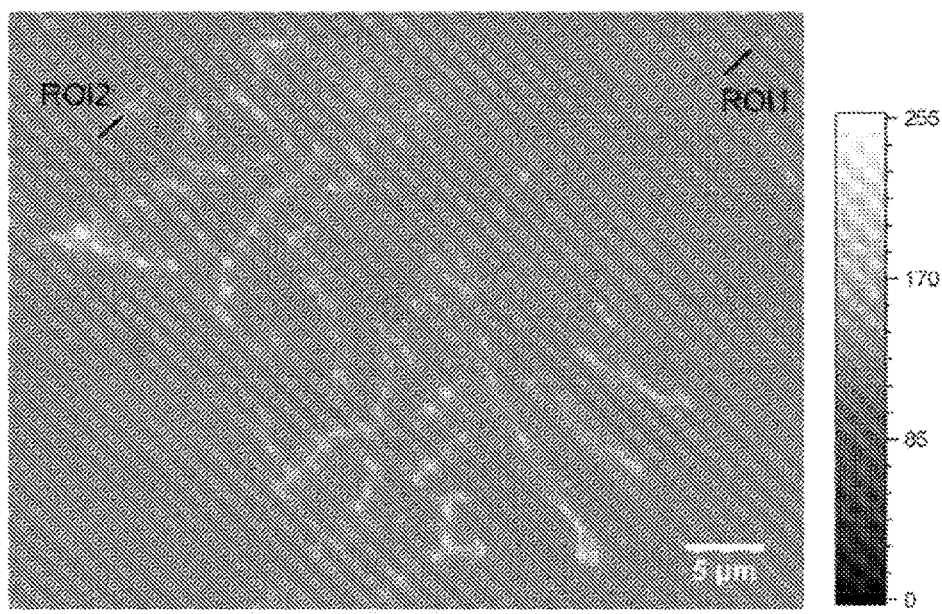
FIG. 3 shows an illustration of a backscattered electron image of an LSX2021 alloy sample.

FIG. 2 shows a backscattered electron image of an LAX410 alloy sample, wherein three examination regions, denoted by ROI 1, ROI 2, and ROI 3, are marked which were examined in greater detail in terms of their element composition. In a corresponding way, FIG. 3 shows a backscattered electron image of an LSX2021 alloy sample, wherein two examination regions, ROI 1 and ROI 2, are marked. The backscattered electron images are in this case embodied as gray value images with a gray value spectrum of 0 to 255.

Figure 4:
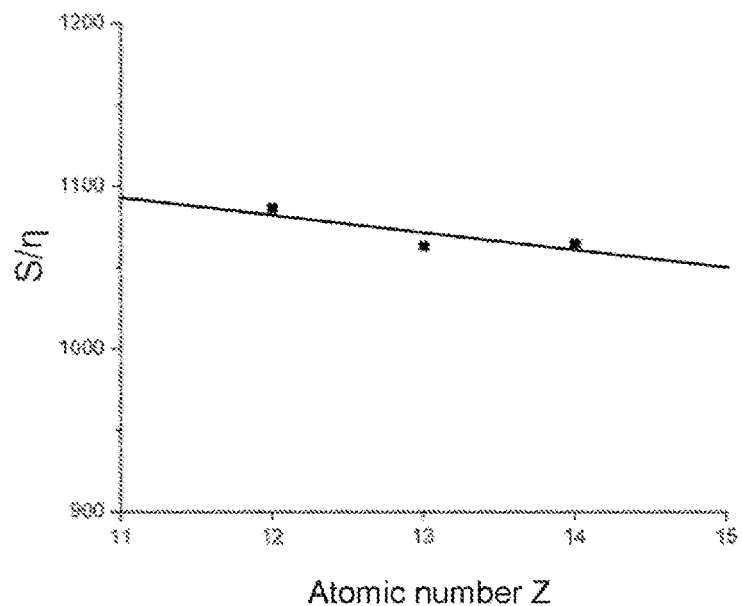
FIG. 4 and FIG. 5 show calibration curves determined -using calibration standards.
Figure 5:
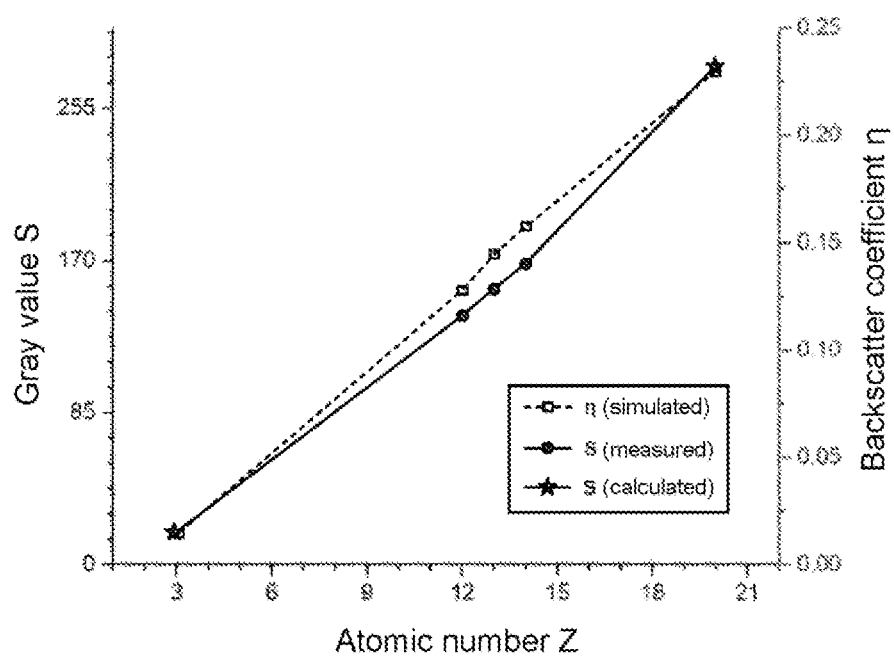

In order to calculate a respective mean reference gray value $\overline{S}_V$ based on the element composition determined by means of EDX, also referred to as spectroscopy element composition, of the respective examination regions, calibration samples formed from essentially pure Al, Mg, and Si were measured. Related calibration curves with measured calibration gray values S and backscatter coefficients η determined by means of simulation are illustrated in FIG. 4 and FIG. 5. In this case, a ratio of the calibration gray value S and backscatter coefficient η is expediently illustrated over the atomic number Z in FIG. 4, in order to form a linear relation between the calibration gray value and the atomic number. FIG. 5 illustrates both gray values S and backscatter coefficients over the atomic number Z, wherein for Li a calculated gray value is indicated over the atomic number Z. In Table 2, the spectroscopy element composition, formed from Mg, Al, and Ca, measured by means of EIDX of the respective examination regions is stated for the LAX410 alloy sample, and that composition for the LSX2012 alloy sample, formed from Mg, Si, and Ca, is stated in Table 3. Furthermore, in Table 2 and Table 3, the respective mean reference gray value $\overline{S}_V$ calculated from the spectroscopy element composition and a mean measured gray value $\overline{S}_M$ of the respective examination region of the related backscattered electron image are stated.

Based on the formula $$x = \frac{\overline{S}_M - \overline{S}_V}{\overline{S}_B - \overline{S}_V},$$

the fraction x of Li in the respective examination region was thus calculated, wherein $\overline{S}_M$ signifies a mean measured gray value, $\overline{S}_V$ signifies a mean reference gray value, and $\overline{S}_B$ signifies a mean determination element gray value, in this case that for Li.

TABLE 2

For LAX410: Fractions of Mg, Al, and Ca in wt % determined by means of X-ray spectroscopy; mean measured gray value $\overline{S}_M$ of the backscattered electron image; calculated mean reference gray value $\overline{S}_V$ and calculated fraction of Li in wt %.

|  | ROI 1 | ROI 2 | ROI 3 |
|---|---|---|---|
| Mg | 99.3 | 84.1 | 60.6 |
| Al | 0.6 | 8.2 | 18.1 |
| Ca | 0.2 | 7.7 | 21.3 |
| $\overline{S}_V$ (calculated) | 139 | 151 | 171 |
| $\overline{S}_M$ (measured) | 136 | 148 | 178 |
| Li (calculated) | 2.8 | 2.2 | — |

TABLE 3

For LSX2021: Fractions of Mg, Si, and Ca in wt % determined by means of X-ray spectroscopy; mean measured gray value $\overline{S}_M$ of the backscattered electron image; calculated mean reference gray value $\overline{S}_V$ and calculated fraction of Li in wt %.

|  | ROI 1 | ROI 2 |
|---|---|---|
| Mg | 98.5 | 69.8 |
| Si | 0.5 | 13.1 |
| Ca | 0.9 | 17.2 |
| $\overline{S}_V$ (calculated) | 140 | 167 |
| $\overline{S}_M$ (measured) | 119 | 169 |
| Li (calculated) | 17.5 | — |

As can be seen in Table 2 and Table 3, an Li fraction of 2.8 wt % and 17.5 wt %, respectively, was determined for the ROI 1 of the alloy samples. For both the LAX410 alloy sample and the LSX2021 alloy sample, the ROI 1 relates to a matrix region of the respective alloy morphology. The Li fractions determined for the ROI 1 are somewhat lower than, but very close to, the nominal Li fractions according to Table 1. As can be seen in Table 2 and Table 3, the ROI 2 of the LAX410 alloy sample and LSX2O2I alloy sample have slightly higher calculated mean reference gray values $\overline{S}_V$ than mean measured gray values $\overline{S}_M$, which indicates a lack of Li. For ROI 2 of the LAX410 alloy sample, the Li fraction was determined to be 2.2 wt %. The related microstructure appears to comprise a dendritic structure with Li-free intermetallic compounds, such as $Al_2Ca$ or $Mg_2Ca$ Laves phases, and a matrix formed with Li. The ROI 3 of the LAX410 alloy sample is embodied to be essentially Li-free.

It is thus shown that, with the method according to the invention, a quantitative determination of elements having a smaller atomic number, in particular lithium, is enabled with high accuracy in that backscattered electron signals, in particular backscattered electron images, and X-ray spectroscopy measurement results are synergistically combined. A bonding state of the determination element thereby advantageously plays a secondary role, since a backscattering or a backscatter coefficient of backscattered electrons is typically dominated by the nucleus of the respective element.

The invention claimed is:

1. A computer-assisted method for determining an element fraction of a determination element of an examination region of a sample bombarded with primary electrons, comprising the steps of:

capturing a backscattered electron signal using a backscattered electron detector, obtaining using an X-ray spectroscopy detector a spectroscopy element composition of the examination region, combining a measured gray value SM determined from the backscattered electron signal with element fractions of the spectroscopy element composition in order to determine a fraction of the determination element, calculating a reference gray value SV using the element fractions of the spectroscopy element composition, and determining the fraction of the determination element using a comparison of the measured gray value SM and reference gray value SV.

2. The method according to claim 1, wherein combining the measured gray value SM and the element fractions of the spectroscopy element composition occurs using backscatter coefficients of the element fractions.

3. The method according to claim 1, wherein one or more calibration samples are measured using the backscattered electron detector, in order to assign specific gray values to specific elements or element compositions.

4. The method according to claim 1, wherein a calibration sample formed with or from the determination element is measured using the backscattered electron detector, in order to assign a gray value to the determination element.

5. The method according to claim 1, wherein the examination region of the sample is bombarded with a primary electron beam and electrons backscattered from the examination region are detected using the backscattered electron detector in order to capture the backscattered electron signal, and X-rays emitted from the examination region are detected using the X-ray spectroscopy detector in order to determine the spectroscopy element composition.

6. The method according to claim 1, wherein the determination element has a small atomic number.

7. The method according to claim 6, wherein the determination element is lithium.

8. The method according to claim 1, wherein the captured backscattered electron signal is a backscattered electron image.

9. The method according to claim 1, wherein the X-ray spectroscopy detector is an EDX detector.

10. The method according to claim 1, wherein the comparison is based on a difference between the measured gray value SM and reference gray value SV.

11. The method according to claim 5, wherein the X-ray spectroscopy detector is an EDX detector.

12. An electron microscope, comprising:
a device having at least one processor for processing data;
a backscattered electron detector;
an X-ray spectroscopy detector; and
wherein the electron microscope is configured to carry out the method according to claim 1.

13. A non-transitory computer-readable recording medium for use in a computer, the recording medium having a computer program recorded thereon for causing the computer in combination with a backscattered electron detector, and an X-ray spectroscopy detector to carry out the method according to claim 1.

* * * * *